April 18, 1967 W. P. CARROLL 3,314,189
REMOTE, LIGHT ACTUATED CONTROL MEANS FOR MODELS
Filed Aug. 10, 1964 2 Sheets-Sheet 2
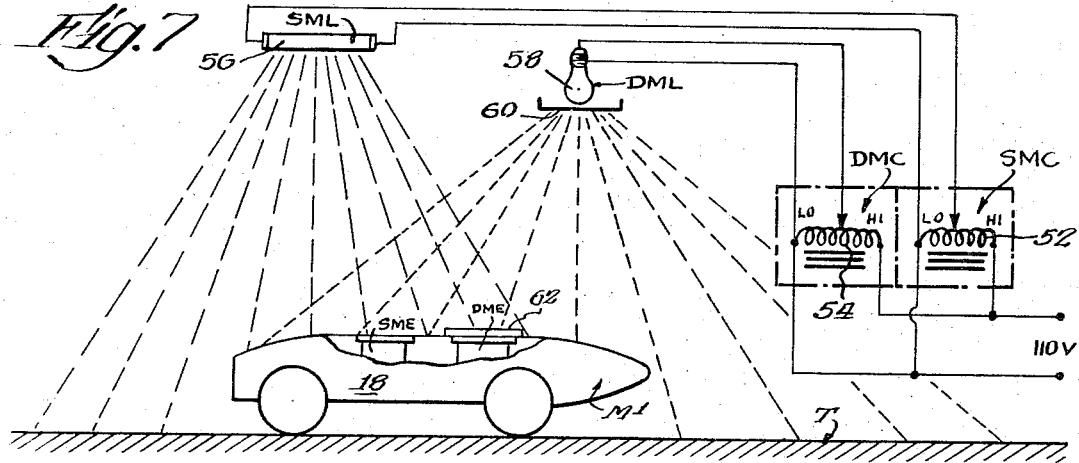
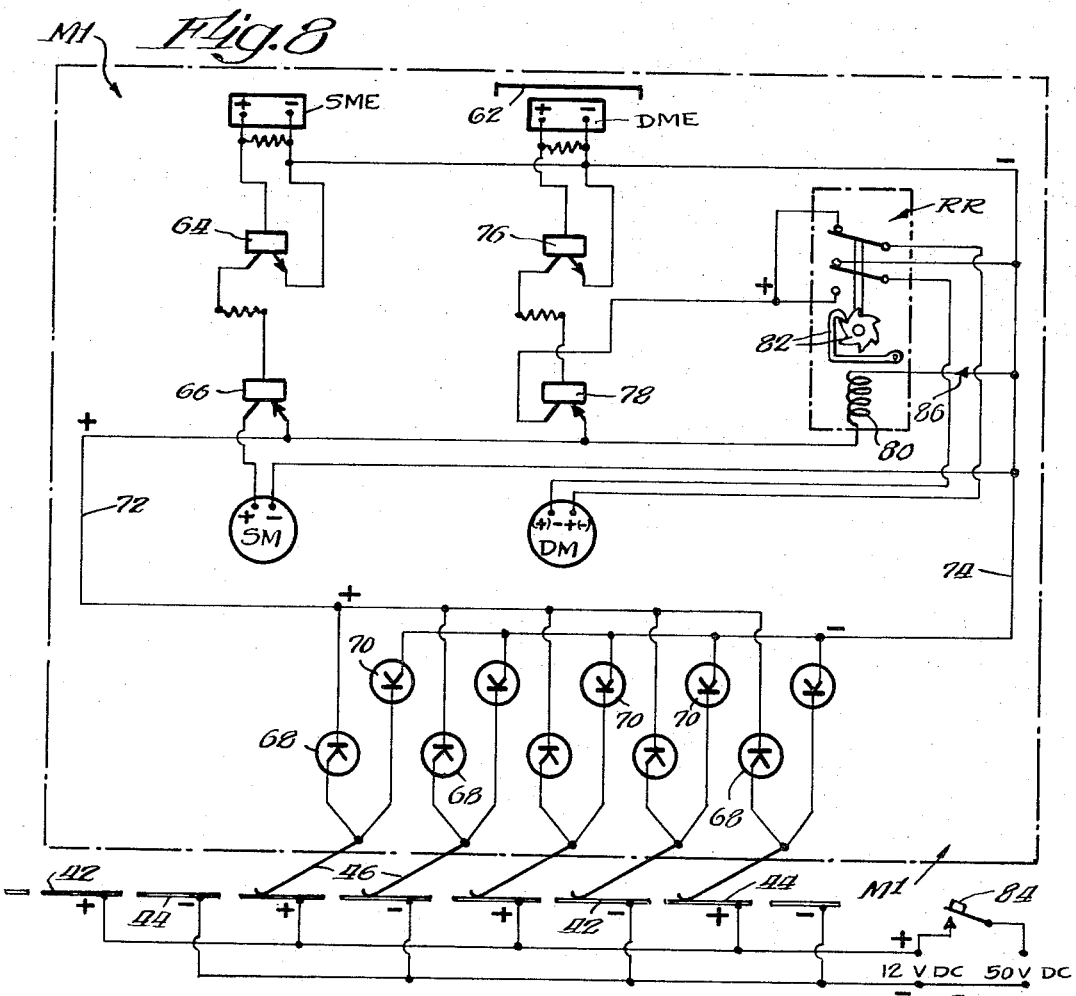
Inventor
William P. Carroll
By
Bair, Freeman & Molinare
Attys.

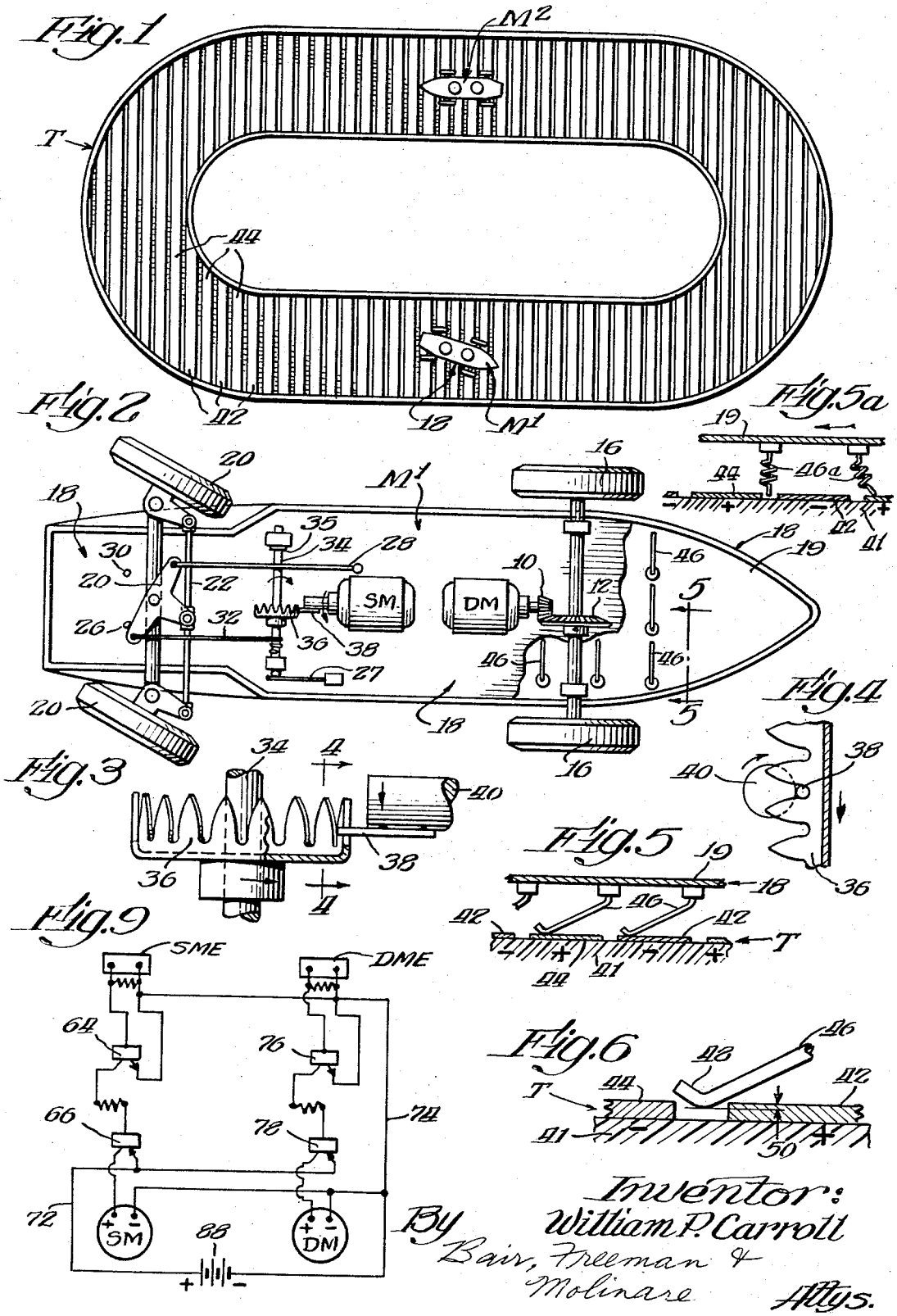

United States Patent Office 3,314,189
Patented Apr. 18, 1967

3,314,189
REMOTE, LIGHT ACTUATED CONTROL
MEANS FOR MODELS
William P. Carroll, 330 S. Wells St.,
Chicago, Ill. 60606
Filed Aug. 10, 1964, Ser. No. 388,463
17 Claims. (Cl. 46—244)

This invention relates to remote control means for models such as model automobiles, boats, air cushion vehicles or other types of moving models.

One object of the invention is to provide supporting means for models such as a track which is electrically charged, the model having power pick-up means cooperating with the track as the model moves over the track.

Another object of the invention is to provide remote control means for a model in the form of a light source means directed toward the model, the model having light sensing means for controlling a drive motor of the model.

Still another object is to provide a second light source means and a second light sensing means on the model for controlling a steering motor of the model.

Still another object is to provide means for selectively varying the intensity of the light sources and thereby the response of the light sensing means thereto so the speed of rotation as well as the speed of acceleration and deceleration of the drive motor and steering motor of the model may be controlled as desired.

A further object is to provide light sources of different wave lengths so that one of the light sensing means is responsive to only one of the light sources and the other light sensing means is responsive to only the other light source.

Still a further object is to provide track means for supplying current to the drive motor and steering motor of the model in the form of negatively and positively charged strips, spaced from each other, the model having an arrangement of current collector brushes and rectifiers such that a proper output polarity is provided to supply current to the driving motor and the steering motor.

An additional object is to provide the model with a reversing relay for the drive motor which is of the stepping type for alternately reversing the current to the drive motor upon successive actuations of the relay, and to provide means for actuating the relay independent of the drive motor but from the same track and collector brush system in the form of a momentary switch for applying a higher voltage, the coil of the relay being responsive only to such higher voltage.

Another additional object is to provide further means to insure proper response of a certain light sensing means on the vehicle to a certain light source in the form of filter means interposed between a light source and its light sensitive means to provide the proper wave lengths for response independent of certain other light sources and their light sensitive means, whereby two or more models may be individually controlled by two or more dual light sources for drive and steering control so that two drivers can operate two models in an automobile race, for example, without the controls of one interfering with the controls of the other.

With these and other objects in view, my invention consists in the construction, arrangement and combination of the various parts of my remote control means for models, whereby the objects above contemplated are attained, as hereinafter more fully set forth, pointed out in my claims and illustrated in detail on the accompanying drawings, wherein:

FIG. 1 is a plan view of a race track showing one embodiment of my invention and a pair of models of the wheeled-vehicle-type simulating racing automobiles on the track;

FIG. 2 is an enlarged underside view of one of my models showing a typical drive motor and steering motor installation together with steering mechanism and a collector brush system;

FIG. 3 is an enlargement of a portion of the steering mechanism shown in FIG. 2;

FIG. 4 is a sectional view no the line 4—4 of FIG. 3 to show the relationship between a gear of the steering mechanism and a driving projection of the steering motor;

FIG. 5 is a sectional view on the line 5—5 of FIG. 2 showing a pair of collector brushes and associated track strips for supplying electric current thereto;

FIG. 5a is a view similar to FIG. 5 showing a modification;

FIG. 6 is an enlargement of a portion of FIG. 5 to show the relationship of parts during operation;

FIG. 7 is a diagrammatic side view showing a track, a model and a pair of light sources for remotely controlling the model;

FIG. 8 is an electro-diagrammatic view of light sensing means and the electrical components carried by the vehicle for controlling a drive motor and steering motor thereof, and FIG. 9 is a similar electrical diagram showing a modified form of model having a self-contained supply of electric current for the drive and steering motors.

On the accompanying drawings there are several items bearing reference characters which are below identified:

DM Drive Motor
SM Steering Motor
DML Drive Motor Light Source
SML Steering Motor Light Source
DMC Drive Motor Control
SMC Steering Motor Control
DME Drive Motor Eye
SME Steering Motor Eye
RR Reversing Relay Referring to FIG. 2 the drive motor DM may be provided with a bevel pinion 10 meshing with a bevel gear 12 on a drive axle 14 on which a pair of drive wheels 16 are mounted, such drive assembly being mounted on a vehicle body indicated generally at 18. The vehicle is shown with steerable wheels 20 and steering linkage including a tie rod 22 and a steering lever 24. The steering lever is biased in one direction as against a stop 26 by a rubber band or the like 28. It is adapted to be actuated in the opposite direction against a stop 30 by a flexible element such as a cord 32 or the like wrapped around a steering shaft 34 which carries a crown gear 36. For actuating the gear 36 resilient off-center pin 38 of piano wire or the like secured to a steering motor shaft 40 is provided as shown particularly in FIGS. 3 and 4, the operation of which will be hereinafter explained. The steering shaft 34 has a collar 35 biased against a bearing for the shaft by a light leaf spring 27.

A track shown generally at T in FIG. 1 is provided for supporting a model M¹ shown in FIG. 2. FIG. 1 illustrates two such models, the second one being indicated as M². In FIGS. 7, 8 and 9 I will refer to the control means for only one model such as the model M¹. The track T is characterized by electric current supply means in the form of a plurality of conducting strips 42 and 44 alternating with each other, and with their edges spaced slightly from each other as shown in FIGS. 5 and 6. Collector brush means is provided on the model for picking up electric current and is in the form of spring wires 46 carried by a bottom panel 19 of the model body 18. The wires are under tension when the wheels 16 and 20 of the model are supported on a base 41 of the track T for contacting the conductor strips 42 and 44. The tension is such that as shown in FIG. 6 the unrestricted position of the spring wire 46 is with its curved lower end 48 just below the upper surface of the track (dimension 50) yet the bend 48 does not short circuit across the adjacent track strips. The lower end of each spring wire 46 has this bend 48 for providing smooth brush action of the spring wire with respect to the track regardless of the direction of travel of the model and thereby the spring wire.

I have found a brush arrangement of this character having the brushes arranged in L form as shown in FIG. 2 permits the model to effectively pick up electric current in a continuous manner and of the proper polarity when provided with rectifiers such as shown in FIG. 8 which will be described later. Pick up is effected in any aligned or angular position of the model with respect to the track. FIG. 5a shows a modification using coil springs.

In FIG. 7 I show the model M¹ having the steering motor eye SME and the drive motor eye DME mounted in the top thereof and responsive to light rays from the light sources SML and DML. The eyes SME and DME are photocells or the like and thus constitute light sensing means. The intensity of the light from the source SML is controlled by the steering motor control SMC which may be a manually actuated variable voltage transformer 52. Likewise, the intensity of light from the source DML may be varied by a variable voltage transformer 54 in the drive motor control DMC.

The eye SME is responsive to one wave length range such as that from a fluorescent tube 56 while the eye DME is responsive to the range of light from an incandescent bulb 58, and the eyes may be tailored to respond to only their respective light source. If necessary, a filter 60 such as an infrared filter may be provided for the light source DML and a corresponding filter 62 for the eye DME to insure separation of response by changing the normal range of light and response for this particular light source and its respective light sensing means.

Variations of light striking the eyes SME and DME are utilized to vary the speed of the steering motor SM and the drive motor DM and for this purpose a circuit such as shown in FIG. 8 may be provided. For the motor SM, means for amplifying the signal produced by the eye SME is provided in the form of a pair of transistors 64 and 66, the final transistor 66 modulating the current from the brushes 46 to the steering motor SM. In this figure, a plurality of rectifiers 68 for the positive side of the circuit and a plurality of rectifiers 70 for the negative side of the circuit are shown connected in circuit with the brushes 46 for supplying current of the proper polarity to the positive supply wire 72 and the negative supply wire 74, all within the model M¹.

The drive motor DM is likewise controlled by the drive motor eye DME through amplifying transistors 76 and 78 the same as between the eye SME and the steering motor SM except that a reversing relay RR is interposed in the drive motor circuit. This relay is shown diagrammatically, the coil thereof being shown at 80 and a ratchet and pawl mechanism at 82 for alternately reversing the output from the relay to the drive motor upon successive energizations of the relay coil 80.

The current supplied to the brushes 46 is shown in FIG. 8 as 12 volts direct current. The relay coil 80 is designed for operation on a higher voltage such as in excess of 20 volts. A momentary switch 84 is provided for energizing the coil 80 from a 50 volt D.C. source through a diode 86 which may limit the flow of curent such as below 20 volts and thereby prevents the impression of the 12 volt current on the relay coil. However, when the switch 84 is closed momentarily, the ratchet and pawl mechanism 82 operates to reverse the electric current to the drive motor thereby reversing the direction of travel of the model M¹. Upon a subsequent energization of the relay coil, the current is again reversed so that it flows in the original direction and the model travels forwardly. The polarity of the drive motor is indicated for normal forward operation and in parentheses for reverse operation.

As shown in FIG. 9 the model M¹ may have a self-contained source of electric power such as a battery 88 consisting of a number of flashlight dry cells or the like connected to the supply wires 72 and 74 in place of the spring wire brushes 46 and the rectifiers 68 and 70. The reversing relay RR is not used in this version of the model and the track T may be a plain surface without the conductor strips 42 and 44, or in the case of a boat may be a container for a body of water on which to float a ship model.

From the foregoing description it will be obvious that I have provided a complete remote control system for a model. In the case of a boat or air cushion vehicle, the self-contained source of electric power disclosed in FIG. 9 may be used. Where an electrically charged track of the kind disclosed in FIGS. 1, 5 and 6 is used, the reversing relay RR may be provided and operated through the same track and collector brush system that supplies current to the drive motor and the steering motor. Start, stop, speed, steering and direction (forward or reverse) of the model M¹ may be controlled by the two light sources SML and DML shown in FIG. 7 and the momentary switch 84 shown in FIG. 8. Remote control is accomplished with no attachments or guides of any kind so that the model runs completely free and its driving characteristics are identical to those of a full sized automobile.

Where two models M¹ and M² are to be controlled, a dual light source arrangement similar to that shown in FIG. 7 is also provided for the model M². A second fluorescent tube 56 and a second incandescent bulb 58 may be provided for the second model, and additional filters used for both light sources and both eyes SME and DME of the model M². The light is thus confined by filtering in a different wave length range than provided for the model M¹ and thereby the two models are independently controlled by a control system for each model. Thus both cars can operate on the same track with each car under the complete control of each "driver" in a competitive situation such as "automobile racing." Each model has its two circuits for the drive motor and the steering motor, and dual photocell arrangements. Thus each driver will have complete control of his car but his lights will in no way affect the car of the other driver. The controls can be similarly extended to three or more drivers. The filter arrangement, of course, will be such that the photocells of each model will respond only to the two lights operated by each driver.

The start, stop and speed of the model are controlled by light waves striking one of the photocells of the drive motor transistor circuit and the steering is controlled by a different range of light waves striking the other photocell of the transistor circuit for the steering motor SM. The direction of the model is controlled through the relay RR interposed in the drive motor circuit.

As the intensity of light striking a photocell is increased the amount of power passing through the transistor circuit controlled thereby to each motor is increased. Since the intensity of each light is controlled through a variable voltage transformer, as the voltage of each is increased the intensity of the light is increased permitting more power to flow through the particular circuit.

Control of drive motor DM

I have indicated that start, stop and speed of the motor DM can be controlled. When the light intensity of the source DML is low, the response of the eye DME is insufficient to energize the motor DM sufficiently to overcome the inertia of the model. The model is started by raising the intensity until the inertia is overcome and thereupon the model may be speeded up at any desired rate by the rate of adjustment of the control DMC.

Thus the drive motor will start at a certain level of light and increase or decrease in speed acording to the light intensity. When the level of light is reduced below the starting point, the drive motor will stop. Acceleration and deceleration can be done either slowly or rapidly as desired.

*Control of steering motor SM*

As the steering motor SM revolves, the projection 38 periodically engages the teeth of the gear 36. At low motor speed the projection will re-engage the same tooth of the gear each revolution of the motor shaft 40 causing the steering lever 24 to oscillate against the bias of the rubber band 28 and keep bumping against the stop 26. The steering shaft 34 will also be slightly reciprocated against the bias of the leaf spring 37 which aids in balancing the forces of operation so that rotation of the steering shaft 34 is thus prevented and mere oscillation thereof takes place. Accordingly the model remains in "hard left" steering position.

As the speed of the steering motor SM increases, the more rapid rotation of the projection 38 begins turning the gear 36 by engaging successive teeth thereof, the inertia of the gear preventing sufficient retrograde movement thereof to return the steering mechanism to the hard left position. If the speed of rotation is sustained, the steering mechanism will continue to the opposite extreme ("hard right") with the lever 24 against the stop 30. Depending upon the intensity of the light from the fluorescent tube 56 and the speed with which the intensity is increased or decreased, the steering wheels 20 can be turned in either direction very slightly or to a maximum position, and turned slowly or rapidly as desired. When the steering wheels reach any desired position, the light intensity can be decreased so that the shaft rotation of the steering motor SM is decreased sufficiently to prevent further rotation of the gear 36 and cause periodic engagement of the projection 38 with the same gear tooth. Thus the steering mechanism is held in any angular position desired.

When it is desirable to make the model run backwardly the short pulse of higher voltage is applied to the track by the momentary switch 84 which reverses the relay contacts from the position shown in FIG. 8. The next surge of high voltage applied by the momentary switch 84 reverses the relay contacts to the position shown in FIG. 8 and the model travels forwardly. Thus the model travels forwardly, then rearwardly, then forwardly, etc., on alternate pulses.

As an example of wave length ranges, the fluorescent tube 56 emits in the visible light range from approximately 400 to 700 millimicrons while the tungsten bulb 58 transmits through an infrared filter 60 at approximately 725 millimicrons and over. The photocell DME is covered by an infrared filter 62 identitical to the filter 60 and thus response to over 725 millimicrons is provided for the drive motor circuit. A selenium photocell SME may be provided which responds to wave lengths under 700 so that the tungsten light does not affect this circuit. The eye DME may be a silicon cell which responds readily to wave lengths of over 725 but because of the filter over this cell it does not respond to any transmission from the fluorescent light. Thus each light controls only one circuit and does not affect the other circuit.

The wave length range for the second model $M^2$ may be modified with respect to that shown for the model $M^1$ in FIG. 7 by additional filters, or light sources producing other wave length ranges in an obvious manner.

The track T eliminates wires, slots or the like which would interfere with complete freedom of operation of the models. Each contact spring or pick up brush spring wire 46 picks up either positive or negative power. The rectifiers permit only negative power to go to the wire 74 and positive power to the wire 72. No one contact can touch two strips and the contacts cannot touch each other so that there is no shorting. The contact springs are arranged underneath the model in a position that insures at least one touching a negative strip and one touching a positive strip regardless of the position of the model on the track. The delay in reverse current going through the rectifiers 68 and 70 is only a few microseconds and is not sufficient to interfere with the operation of the motors DM and SM. The model thus operates with complete freedom on the track and has full power at all times in forward, reverse, skidding or even spinning in complete circles.

Some changes may be made in the construction and arrangement of the parts of my remote control means for models without departing from the real spirit and purpose of my invention, and it is my intention to cover by my claims any modified forms of structure or use of mechanical equivalents which may reasonably be included within their scope.

I claim as my invention:

1. In remote control means for models, a support, a model for travel on said support throughout the area thereof, said model having a drive motor for propelling the same, a source of electric current for said drive motor, means for remotely controlling the flow of electric current from said source to said drive motor and thereby the speed of said drive motor comprising light sensitive means carried by said model and a variable intensity light source directed toward and spanning the area of said support to stimulate said light sensitive means at any position of said model with respect to said area, and a circuit between said source and said drive motor controlled by said light sensitive means, said circuit energizing said drive motor in response to stimulation by said variable intensity light source and in proportion to the degree of stimulation of said light sensitive means by said light source.

2. Remote control means as claimed in claim 1 wherein said model is steerable and mechanism is provided for effecting steering thereof including a steering motor, a second light sensitive means carried by said model, a second variable intensity light source directed toward and spanning the area of said support to stimulate said second light sensitive means, a second circuit between said source and said steering motor controlled by said second light sensitive means at any position of said model with respect to said area, said second circuit energizing said steering motor in response to stimulation by said second variable intensity light source and in proportion to the degree of stimulation of said second light sensitive means by said second light source, said first and second light sources having different wave length ranges and said first and second light sensitive means having different wave length response matched to said different wave length ranges whereby the first light sensitive means responds only to the first light source and the second light sensitive means responds only to the second light source.

3. Remote control means as claimed in claim 1 wherein current amplifying means is provided between said light sensitive means and said drive motor.

4. Remote control means as claimed in claim 2 wherein current amplifying means is provided between said first light sensitive means and said drive motor, and second current amplifying means is provided between said second light sensitive means and said steering motor.

5. Remote control means as claimed in claim 2 wherein light filter means is provided between one of said light sources and its respective light sensitive means to insure separation of response for the respective light sensitive responsive means.

6. Remote control means as claimed in claim 2 wherein said steering mechanism comprises a steering shaft on said model, a gear thereon, an off-center finger carried by the shaft of said steering motor for meshing with said gear, a steering linkage system operatively connecting said steering shaft to steerable wheels of said model, and means biasing said linkage in one direction, said shaft when rotated by said steering motor moving the linkage in the opposite direction.

7. Remote control means as claimed in claim 6 wherein the speed of said steering motor and said means biasing said linkage in said one direction are so coordinated as to effect rotation of said gear when said motor is rotated at one speed sufficient to cause said off-center finger to engage successive teeth of said gear in one direction but when rotated at a lower speed, intermittent engagement of said off-center finger with a single tooth of said gear holds said gear against retrograde rotation by said biasing means and when rotated at a still lower speed permits such retrograde rotation of said gear by said biasing means with said off-center finger engaging successive teeth of said gear in an opposite direction.

8. In remote control means for models, a track, a model of the wheeled vehicle type for travel on said track, means for electrically charging said track, said vehicle having a drive motor for propelling the same, brush means carried by said vehicle to pick up electrical current from said track to energize said drive motor, means for remotely controlling the degree of electric current picked up and thereby the speed of said drive motor comprising light sensitive means carried by said vehicle and a variable intensity light source stationary with respect to, directed toward and spanning the area of said track to stimulate said light sensitive means at any position on said track, and a circuit between said brush means and said drive motor controlled by said light sensitive means, said circuit energizing said drive motor in response to stimulation by said variable intensity light source and in proportion to the degree of stimulation of said light sensitive means by said light source.

9. Remote control means as claimed in claim 8 wherein said track comprises a plurality of alternating positively and negatively charged strips spaced from each other and said brush means comprises a plurality of spring wires extending downwardly from said model with their contact ends disposed in L form.

10. Remote control means as claimed in claim 8 wherein current amplifying means is provided on said vehicle between said light sensitive means and said drive motor.

11. Remote control means as claimed in claim 8 wherein certain of the wheels of said wheeled vehicle are steerable, and mechanism is provided for effecting steering thereof including a steering motor, a second light sensitive means carried by said vehicle, a second variable intensity light source directed toward and spanning the area of said track to stimulate said second light sensitive means, a second circuit between said brush means and said steering motor controlled by said second light sensitive means at any position of said vehicle with respect to said track, said second circuit energizing said steering motor in response to stimulation by said second variable intensity light source in proportion to the degree of stimulation of said second light sensitive means by said second light source, said first and second light sources having different wave lengths and said first and second light sensitive means having different wave length response whereby the first light sensitive means responds only to the first light source and the second light sensitive means responds only to the second light source.

12. Remote control means as claimed in claim 11 wherein current amplifying means is provided between said second light responsive means and said steering motor.

13. Remote control means as claimed in claim 11 wherein current amplifying means is provided between said first light sensitive means and said drive motor and second current amplifying means is provided between said second light sensitive means and said steering motor.

14. Remote control means as claimed in claim 11 wherein light filter means is provided between one of said light sources and its respective light sensitive means to insure separation of response for the respective light sensitive means.

15. Remote control means as claimed in claim 11 wherein said steering mechanism comprises a steering shaft on said model, a gear thereon, an off-center finger carried by the shaft of said steering motor for meshing with said gear, a linkage system for steering the steerable wheels of said vehicle, said linkage system operatively connecting said steering shaft to said steerable wheels, and means biasing said linkage in one direction, said steering shaft when rotated by said steering motor moving the linkage in the opposite direction.

16. Remote control means as claimed in claim 15 wherein said steering motor and said means biasing said linkage in said one direction are so coordinated as to effect rotation of said gear when said motor is rotated at one speed sufficient to cause said off-center finger to engage successive teeth of said gear in one direction but when rotated at a lower speed intermittent engagement of said off-center finger with a single tooth of said gear holds said gear against retrograde rotation by said biasing means and when rotated at a still lower speed permits such retrograde rotation of said gear by said biasing means with said off-center finger engaging successive teeth of said gear in an opposite direction.

17. Remote control means as claimed in claim 15 wherein said steering motor shaft and said steering shaft are at right angles to each other, said gear is a crown gear and said steering shaft is biased axially in the direction which moves said crown gear toward the axis of said motor shaft and finger.

References Cited by the Examiner

UNITED STATES PATENTS

| 1,897,748 | 2/1933 | Bonanno | 104—151 |
| 3,100,264 | 8/1963 | Jaffe et al. | 250—203 |
| 3,171,963 | 3/1965 | Bourgignon | 46—244 X |
| 3,205,618 | 9/1965 | Heytow | 46—244 |

RICHARD C. PINKHAM, *Primary Examiner.*

R. F. CUTTING, *Examiner.*